United States Patent [19]
Nortier

[11] Patent Number: 5,549,487
[45] Date of Patent: Aug. 27, 1996

[54] SPLASHPROOF ENCLOSURE FOR ELECTRONIC FAUCET

[75] Inventor: Richard A. Nortier, Westchester, Ill.

[73] Assignee: Sloan Valve Company, Franklin Park, Ill.

[21] Appl. No.: 364,559

[22] Filed: Dec. 27, 1994

[51] Int. Cl.$^6$ .............. H01R 13/52; H05K 5/00
[52] U.S. Cl. .......... 439/521; 439/519; 439/76.1; 361/730
[58] Field of Search ............... 439/521, 519, 439/76; 137/360; 361/730, 826, 827, 832, 752, 753; 52/220.8, 28

[56] References Cited

U.S. PATENT DOCUMENTS

| | | | |
|---|---|---|---|
| 4,795,857 | 1/1989 | McInnis | 439/521 |
| 5,133,165 | 7/1992 | Wimberly | 52/220.8 |
| 5,377,076 | 12/1994 | Wen | 361/730 |
| 5,439,759 | 8/1995 | Lippert et al. | 439/521 |

FOREIGN PATENT DOCUMENTS 4061040  4/1994  Japan ................. 439/519

Primary Examiner—David L. Pirlot
Assistant Examiner—Adesh Bhargava
Attorney, Agent, or Firm—Dorn, McEachran, Jambor & Keating

[57] ABSTRACT

A splashproof enclosure for use in mounting the electrical control circuits for connecting electric power to a sensor operated electric actuator for a toilet room plumbing device such as an electronic faucet includes a base and a cover mounted on the base. The base is formed and adapted to mount on a toilet room wall and has a power cord opening so that a power cord may enter said enclosure from the rear. There are spacing channels on the side of the base facing the toilet room wall to space the base from the wall to allow fluid to flow behind the enclosure. There is a dam positioned on the upper side of the power cord opening and extending toward the toilet room wall to divert fluid around the power cord opening. The cover is attached to the base and there are seal elements between the cover and base preventing the entry of fluid into the interior of the enclosure. There are cable entrance ports in the cover and the base providing a plurality of openings for cables for the sensor and electric actuators. Each of the cable entrance ports include ribs for securing the cables to the enclosure.

20 Claims, 3 Drawing Sheets

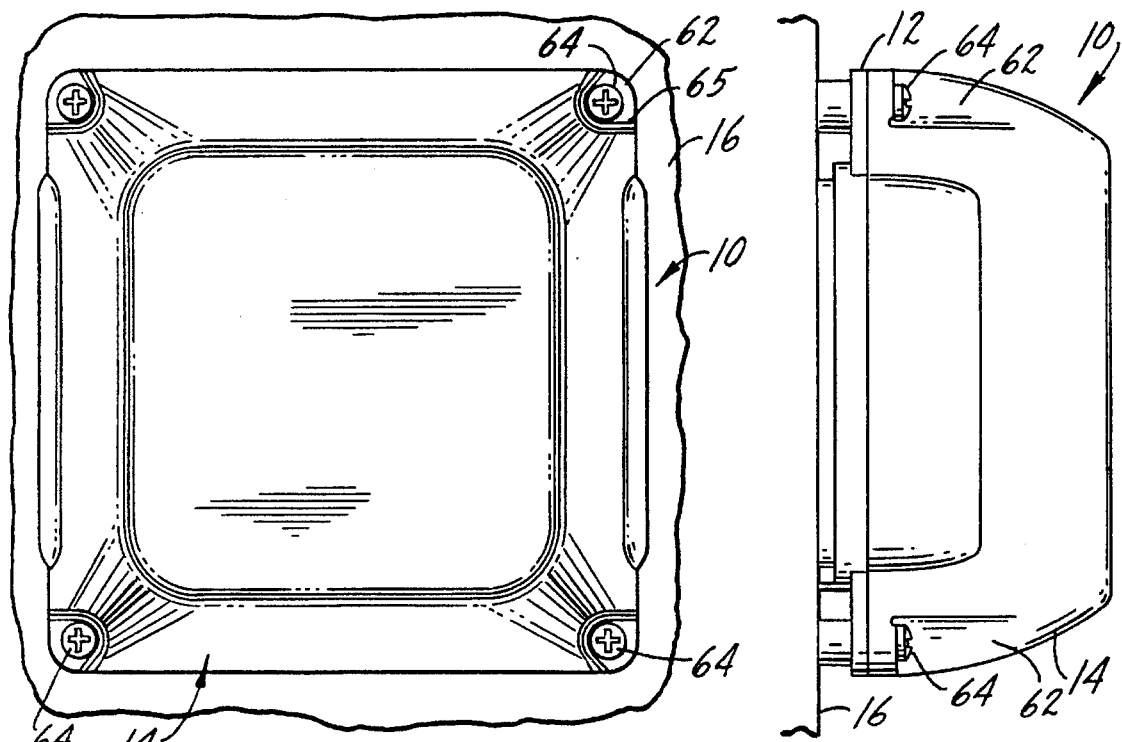
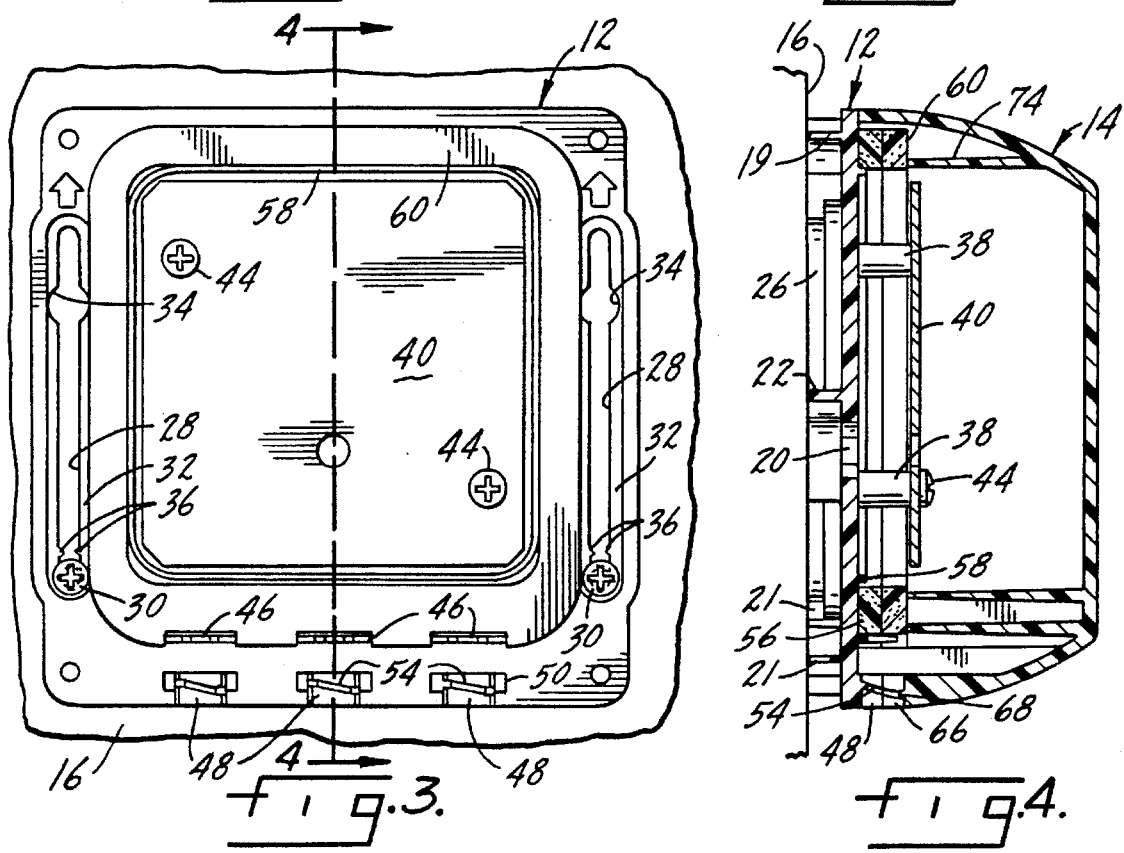

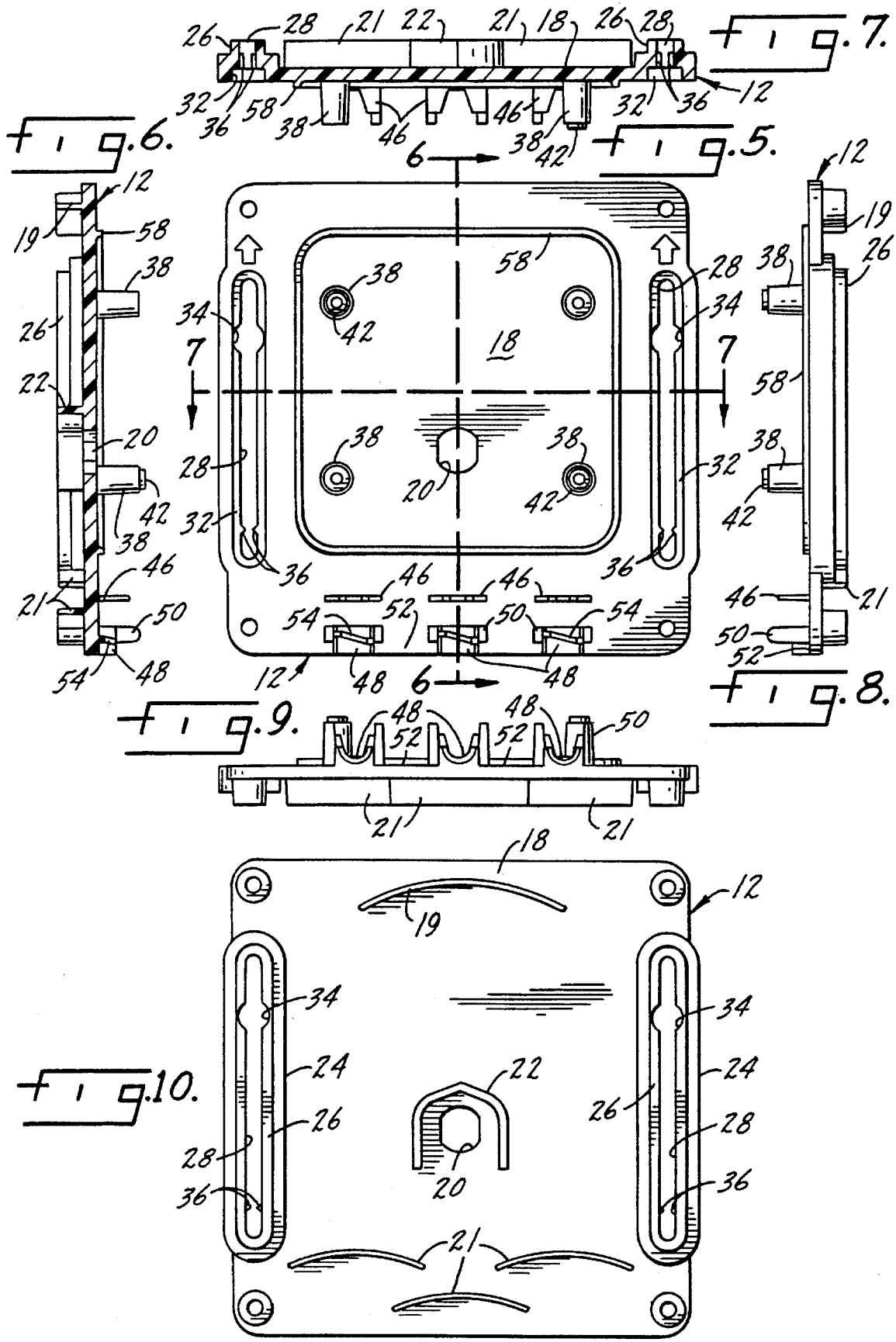

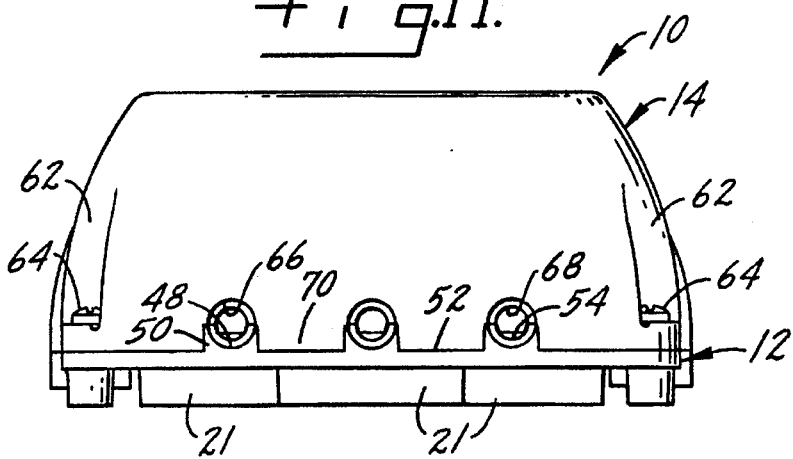
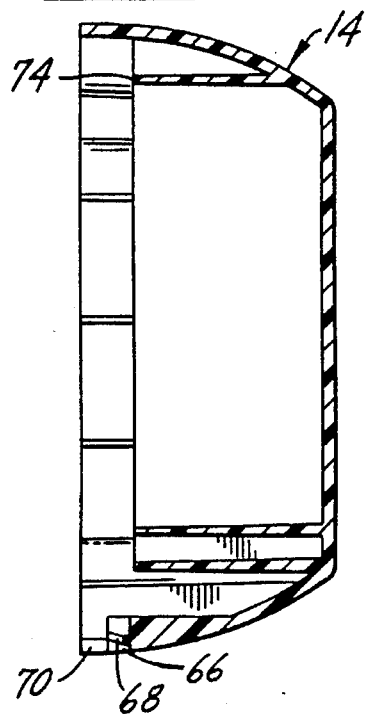
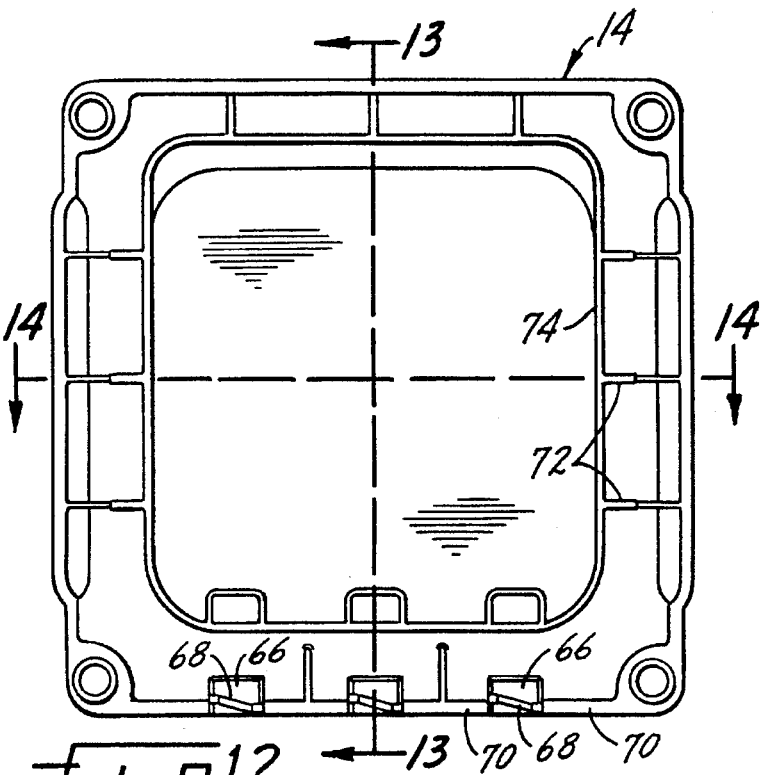
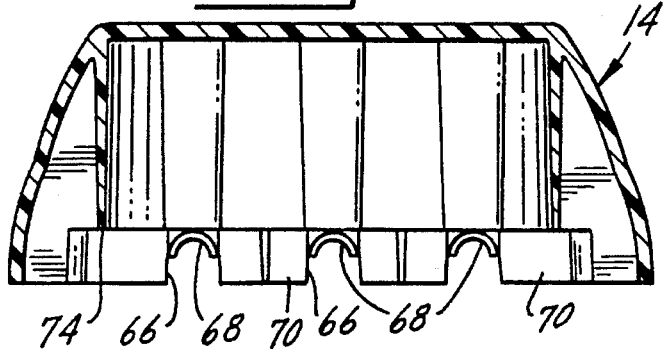

SPLASHPROOF ENCLOSURE FOR ELECTRONIC FAUCET

THE FIELD OF THE INVENTION

The present invention relates to enclosures for electronic circuits for use in toilet rooms, and more particularly, commercial washrooms in which there are sensor operated electronic faucets and similar plumbing devices. It is important in such an environment to have a splashproof enclosure so that water or cleaning fluid which is occasionally on the walls of the toilet room will not affect the electric components inside the enclosure. It is common today for public washrooms to be subjected to high pressure washing systems and the enclosure of the present invention prevents water from such use entering the enclosure and shorting the electric circuits. Further, it is important that these enclosures be easy to install and easy to maintain, but yet be removed from view to protect from vandalism.

The present invention provides an electronic circuit enclosure which meets the above requirements. It is spaced from the toilet room wall so that water may flow behind it. The power cord enters the enclosure from the rear where it is protected. There is a barrier or dam surrounding the power cord opening to prevent moisture or fluid from entering the enclosure at this location. There are helical ribs at the entrance ports for the sensor and electric actuator cables to function as strain reliefs. The enclosure is protected from dust, water and cleaning solutions and includes a seal which is effective not only to seal the base and the cover, but also to seal the entrance ports for the sensor and electric actuator cables. The base of the enclosure can be mounted at one location on the wall, in an upright position where it is accessible. After the requisite cables have been attached, the enclosure can then be moved up closer to the sink where it is relatively hidden from view.

SUMMARY OF THE INVENTION

The present invention relates to enclosures to protect electric circuitry in toilet rooms and more particularly for electric sensor operated faucets.

A primary purpose of the invention is a splashproof enclosure for the use described in which the enclosure has specific design features to prevent dust, water or cleaning fluid from reaching its interior.

Another purpose of the invention is an enclosure of the type described having an improved mounting to the toilet room wall.

Another purpose is an electronic circuit enclosure for the use described which permits water or fluid to flow behind it along the toilet room wall but not to enter the enclosure.

Another purpose is an enclosure having an improved seal.

Another purpose is an enclosure of the type described in which the mounting holes which attach the cover to the base have drain openings.

Another purpose is an enclosure in which the power cord enters the rear, where it is protected, and the electric cables for the faucet sensor and actuators enter from the bottom, with a loop in an upward direction so that no water can flow along the exterior of the cable into the enclosure.

Another purpose is an enclosure of the type described which allows sealing of a variable number of cables, with the entrance ports being sealed if a cable is not present therein.

Another purpose of the invention is an enclosure of the type described which has an integral strain relief for the cables entering therein.

Another purpose is an enclosure for the use described which is low cost and easy to install and maintain.

Another purpose is an enclosure which may be initially mounted in an accessible location for cable connections and then moved to a less visible position.

Other purposes will appear in the ensuing specification, drawings and claims.

BRIEF DESCRIPTION OF THE DRAWINGS

The invention is illustrated diagrammatically in the following drawings wherein:

FIG. 1 is a front view of the enclosure as installed;

FIG. 2 is a side view of the enclosure as installed;

FIG. 3 is a front view of the installed enclosure with the cover removed;

FIG. 4 is a section along plane 4—4 of FIG. 3;

FIG. 5 is a front view of the base;

FIG. 6 is a section along plane 6—6 of FIG. 5;

FIG. 7 is a section along plane 7—7 of FIG. 5;

FIG. 8 is a side view of the base;

FIG. 9 is a bottom view of the base;

FIG. 10 is a rear view of the base;

FIG. 11 is a bottom view of the cover assembled to the base;

FIG. 12 is a rear view of the cover;

FIG. 13 is a section along plane 13—13 of FIG. 12; and

FIG. 14 is a section along plane 14—14 of FIG. 12.

DESCRIPTION OF THE PREFERRED EMBODIMENT

The enclosure of the present invention will be used to house electric circuits controlling the application of power to plumbing devices in toilet rooms and more specifically, to control the application of power to an electronic faucet. The enclosure may be used with other plumbing devices in a toilet room such as flushometers, soap dispensers, and hand dryers. Such devices, as they are presently marketed by the assignee of the present application, Sloan Valve Company, utilize an infrared sensor to initiate the application of power to an electric actuator, with the actuator starting the flow of water through a faucet or supplying water to a flush valve or initiating operation of a soap dispenser or hand dryer. Power is supplied to the enclosure from a conventional power source. The circuits within the enclosure supply power to the infrared sensor and to the electric actuator and send control signals to and from these devices to control their operation.

In the drawings, the enclosure is indicated generally at 10 and is made up of two elements, a base 12 and a cover 14. As shown, the enclosure is mounted to a toilet room wall indicated at 16 and both the cover and the base will be formed of a suitable plastic.

Focusing specifically on the base 12, it includes a wall 18 having a central power cord entry opening 20. There is a dam 22 which is positioned about at least a portion of the opening 20, particularly the upper side of the opening, and will be used to divert water around the opening preventing moisture from entering the enclosure 10.

A large curved rib 19 and three smaller curved ribs 21 function to stiffen the base with the rib curvature allowing water to drain. At opposite sides of the rear of the wall 18 are a pair of mounting channels indicated at 24. The channels are identical and are positioned on opposite sides of the wall and extend in a vertical direction when the enclosure is mounted on the toilet room wall. Each of the channels 24, which extend rearwardly a distance equal to that of the dam 22, have a wall 26 which defines a vertically extending slot 28. The slot 28 is of a size to accept the shank of a threaded fastener, such as that indicated at 30, which will be used to mount the base to the toilet room wall. On the front side of the wall 18, in alignment with the channel wall 26, there is a depression 32 within which the head of the fastener 30 will be positioned. The slot 28 has an enlarged portion 34 which is of a size and shape to accept the head of the fastener 30. Thus, in installation, the fasteners can be screwed into the wall at the appropriate location, the base will be positioned over the fasteners, and then the base can be moved to the desired vertical position by simply moving it in an upward direction, after which the fasteners may be further turned down so that the head is received within the depression 32. Also, it should be noted that near the lower end of each slot 28 there are a pair of inward projections 36 which will be used to lock the base 12 in the desired position as they will hold the shank of the fastener 30 in the position shown in FIG. 3.

The front side of the wall 18 of the base 12 has a plurality, for example four, printed circuit board mounting elements 38. As shown, a printed circuit board 40 is mounted on these elements. At least some of the mounting elements 38, for example two, have alignment bosses 42 to properly align the printed circuit board on the mounting elements. Each of the mounting elements 38 will receive threaded fasteners 44 so that the printed circuit board 40 may be attached to the base 12.

At the bottom side of the base 12 there is a cable stop 46 and a plurality of cable entrance ports 48 which are defined by a wall 50 and a plurality of small outwardly opening passages 52, the purpose of which will be described hereinafter. The base 12 forms the rear portion of each of the entrance ports for the sensor and electric actuator cables. Each of the ports, as defined by the wall 50, has a helical rib 54, with the ribs functioning as a strain relief to hold a spiral steel jacketed cable in position within the ports 48. The power cord and the cables will all be attached to the printed circuit board, which will provide the circuits for controlling operation of the faucet if that is the plumbing device with which the enclosure is to be used.

There are two seal elements which function to prevent moisture from reaching the interior of the enclosure 10. The first seal element 56 extends peripherally about an alignment rib or wall 58 formed on the outward or front side of the wall 18 of the base 12. The seal extends around the outside of the wall and between the wall and the cable stop 46. The seal for the cover, which is indicated at 60, will be coextensive with and lying face down upon the seal 56. The seals are formed of a suitable foam and will be in contact with each other throughout their entire periphery except in those areas where a cable or the wires thereof pass between the seal elements and into the interior for connection to the printed circuit board. If not all of the cable openings are utilized, the compressed seals will prevent any moisture from seeping through in the area of an unused opening as there will be contact at all peripheral portions between the two seal members.

The cover 14 has a generally smooth exterior contour, as indicated, and has a plurality of mounting pockets 62 for the use of fasteners 64 which mount the cover to the base. At each of the pockets 62 there is a small drain passage 65 which is utilized to drain any water which might otherwise be held within the pockets so that no water will accumulate at any place about the exterior of the cover. It is important that the cover be so positioned and so constructed that no water accumulates in any area of the enclosure and that water freely flows between the enclosure and the wall of the toilet room.

The cover includes cable entrance openings 66 which cooperate with the similar openings 48 on the base to form the cable entrance ports. There are helical ribs 68 in the openings 66, which ribs will cooperate with the similar ribs 54 in the ports 48 to function as strain reliefs holding the cables in the appropriate position within the enclosure. As shown in FIG. 14, there are projections 70 between the cable openings 66, with the projections fitting within the passages 50 on the base to form an interlock between the cover and the base so that these elements nest or mate together.

The interior of the cover 14 includes peripherally spaced gasket alignment elements 72 which serve to align the gasket 60 so it is positioned coextensively with the gasket 56. The interior of the enclosure 14 also includes a peripheral gasket support 74 which provides a means for applying compressive pressure on the two gaskets so that they are tightly held together when the cover is mounted on the base.

When installing the described enclosure, it is first mounted on the wall in an accessible location for making the necessary electrical connections between the incoming cables and the P.C. board. The installer may then raise the base up to a location where it is less visible before attaching the cover. The projections 36 assist in holding the base in its raised position.

Of importance in the invention is the spacing of the enclosure from the wall so that fluid, for example washing fluid, will flow behind it, and the dam used to divert fluid away from the power cable entrance opening. In addition, the manner in which the base is mounted to the wall so that it can be installed at one location, but then raised up to a final mounting position through the use of the channels as described. The cable entrance openings and the gasket are important in terms of providing both a strain relief to maintain an enclosure with the cable securely mounted to it and a moistureproof or splashproof enclosure.

Whereas the preferred form of the invention has been shown and described herein, it should be realized that there may be many modifications, substitutions and alterations thereto.

The embodiments of the invention in which an exclusive property or privilege is claimed are defined as follows:

1. A splashproof enclosure for use in mounting electrical control circuits for connecting electric power to sensor operated electric actuators for toilet room plumbing devices, said enclosure including a base and a cover mounted thereto;

said base being formed and adapted to mount on a toilet room wall and having a power cord opening therein whereby a power cord may enter said enclosure through the base thereof, spacing means on the rear of said base facing the toilet room wall to space the base from the toilet room wall to allow fluid to flow behind the enclosure, a dam positioned on the upper side of said power cord opening and extending from said base rear toward the toilet room wall to divert fluid around said power cord opening;

means for attaching said cover to said base, seal means between said cover and base preventing the entry of fluid into the interior of said enclosure, and cooperating means on said cover and said base providing a plurality of cable entrance openings, said cooperating means including means for securing cables to said enclosure.

2. The enclosure of claim 1 characterized in that said spacing means include channels extending vertically along opposite sides of said base.

3. The enclosure of claim 2 characterized in that said channels and said dam extend generally the same distance from said rear of said base.

4. The enclosure of claim 2 characterized in that said channels provide means for mounting said base to a toilet room wall.

5. The enclosure of claim 4 characterized in that each channel includes a generally longitudinal slot having a width to pass the shank of a fastener, and an enlarged opening in said slot, intermediate the ends thereof, of a size to receive the head of a fastener.

6. The enclosure of claim 5 characterized in that each channel includes a coextensive depression of a size to receive the head of a fastener.

7. The enclosure of claim 5 characterized in that each channel has mounting means adjacent one end thereof to position a fastener shank for fixing the base position on the toilet room wall.

8. The enclosure of claim 1 characterized in that said base has mounting posts on the front thereof extending in a direction away from said base for mounting a printed circuit board.

9. The enclosure of claim 8 characterized in that at least a portion of said mounting posts have printed circuit board alignment means thereon.

10. The enclosure of claim 1 characterized in that said cooperating means include aligned openings on said base and on said cover.

11. The enclosure of claim 10 characterized in that said cooperating means includes projections on said cover and mating passages on said base for relative alignment thereof.

12. The enclosure of claim 10 characterized in that at least one of the openings on said base and cover include spiral ribs for securing a cable within an opening.

13. The enclosure of claim 12 characterized in that the openings on each of said cover and said base have spiral ribs thereon.

14. The enclosure of claim 1 characterized in that said seal means include a peripherally extending seal element on said base and a peripherally extending seal element on said cover.

15. The enclosure of claim 14 characterized by and including a peripheral wall on said base for positioning said base seal.

16. The enclosure of claim 14 characterized by and including seal alignment means positioned on said cover, 17. The enclosure of claim 14 characterized in that said peripheral seals extend through the area of said cable openings for either sealing a cable within a cable opening or sealing a cable opening which does not contain a cable.

18. The enclosure of claim 14 characterized by means on said cover for compressing said seals when said cover is mounted on said base.

19. The enclosure of claim 1 characterized in that said enclosure has a generally smooth exterior to prevent the accumulation of fluid thereon.

20. The enclosure of claim 1 characterized in that said cover includes a plurality of mounting holes for attaching said cover to said base, with each of said mounting holes including drain pockets for removing any accumulated fluid in the area about said mounting holes.

* * * * *